United States Patent
Ding et al.

(10) Patent No.: US 12,335,366 B2
(45) Date of Patent: *Jun. 17, 2025

(54) DEVICE AND METHOD FOR DATA PROCESSING

(71) Applicant: Beijing Tenafe Electronic Technology Co., Ltd., Beijing (CN)

(72) Inventors: Xiaojun Ding, Shanghai (CN); Zhikai Chen, Shanghai (CN)

(73) Assignee: Beijing Tenafe Electronic Technology Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,611

(22) Filed: Dec. 13, 2023

(65) Prior Publication Data

US 2024/0113860 A1   Apr. 4, 2024

Related U.S. Application Data

(63) Continuation of application No. 18/081,416, filed on Dec. 14, 2022, now Pat. No. 11,888,964.

(30) Foreign Application Priority Data

Aug. 11, 2022   (CN) .......................... 202210962458.X

(51) Int. Cl.
*H04L 29/06*   (2006.01)
*H04L 9/06*   (2006.01)

(52) U.S. Cl.
CPC .................................. *H04L 9/0631* (2013.01)

(58) Field of Classification Search
CPC ............... H04L 9/0631; H04L 2209/24; H04L 2209/12
See application file for complete search history.

(56) References Cited

U.S. PATENT DOCUMENTS

| | | |
|---|---|---|
| 7,570,760 B1 | 8/2009 | Olson |
| 2003/0128841 A1 | 7/2003 | Ouyang |
| 2006/0050887 A1 | 3/2006 | Chen |

(Continued)

OTHER PUBLICATIONS

Stevens et al., "Single-chip FPGA Implementation of a Pipelined, Memory-Based AES Rijndael Encryption Design", May 2005, IEEE, pp. 1296-1299 (Year: 2005).

*Primary Examiner* — Dao Q Ho
(74) *Attorney, Agent, or Firm* — Van Pelt, Yi & James LLP

(57) ABSTRACT

1. Each of a plurality of data processing units independently performs an end-to-end encryption operation associated with AES on a data block. The number of data processing units is selected based at least in part on a desired processing throughput rate and power consumption, where the number of data processing units and the selected key length produce a total processing throughput rate that is a multiple of 1/10, 1/12 or 1/14 of a maximum throughput rate. A target data processing unit is selected, including by sequentially communicating with the data processing units in round-robin order to obtain an idle state information until an idle data processing unit is encountered. The target data processing unit generates a ciphertext data block corresponding to the target data block, including by performing all SubByte, ShiftRow, MixColumn, and AddRoundKey transformations.

10 Claims, 5 Drawing Sheets

(56) References Cited

U.S. PATENT DOCUMENTS

| | | | |
|---|---|---|---|
| 2007/0286415 A1* | 12/2007 | Bertoni | H04L 9/0637 380/37 |
| 2008/0285745 A1 | 11/2008 | Teglia | |
| 2010/0153747 A1* | 6/2010 | Asnaashari | H04L 9/0637 713/193 |
| 2010/0262797 A1 | 10/2010 | Rosikiewicz | |
| 2014/0169553 A1 | 6/2014 | Chen | |
| 2015/0349951 A1 | 12/2015 | Farrugia | |
| 2017/0302438 A1* | 10/2017 | Yang | G06F 13/4282 |
| 2017/0373836 A1 | 12/2017 | Rarick | |
| 2020/0119903 A1 | 4/2020 | Thomas | |
| 2020/0259651 A1 | 8/2020 | Mohassel | |
| 2022/0138286 A1* | 5/2022 | Zage | H04L 63/0428 726/26 |
| 2022/0309190 A1 | 9/2022 | Gopal | |
| 2023/0045254 A1 | 2/2023 | Xiu | |

* cited by examiner

DEVICE AND METHOD FOR DATA PROCESSING

CROSS REFERENCE TO OTHER APPLICATIONS

This application is a continuation of U.S. patent application Ser. No. 18/081,416 entitled DEVICE AND METHOD FOR DATA PROCESSING filed Dec. 14, 2022, which is based upon and claims priority to People's Republic of China Patent Application No. 202210962458.X entitled DEVICE AND METHOD FOR DATA PROCESSING filed Aug. 11, 2022, each of which is incorporated herein by reference for all purposes.

BACKGROUND OF THE INVENTION

Encryption technology has an important role in the field of information security. At present, Advanced Encryption Standard (AES) has been rapidly developed in various fields because of its advantages such as fast encryption and decryption speed and good resistance to attacks. Therefore, how to implement AES in a desirable manner becomes one of the problems to be solved.

BRIEF DESCRIPTION OF THE DRAWINGS

Various embodiments of the invention are disclosed in the following detailed description and the accompanying drawings.

DETAILED DESCRIPTION

Figure 1:
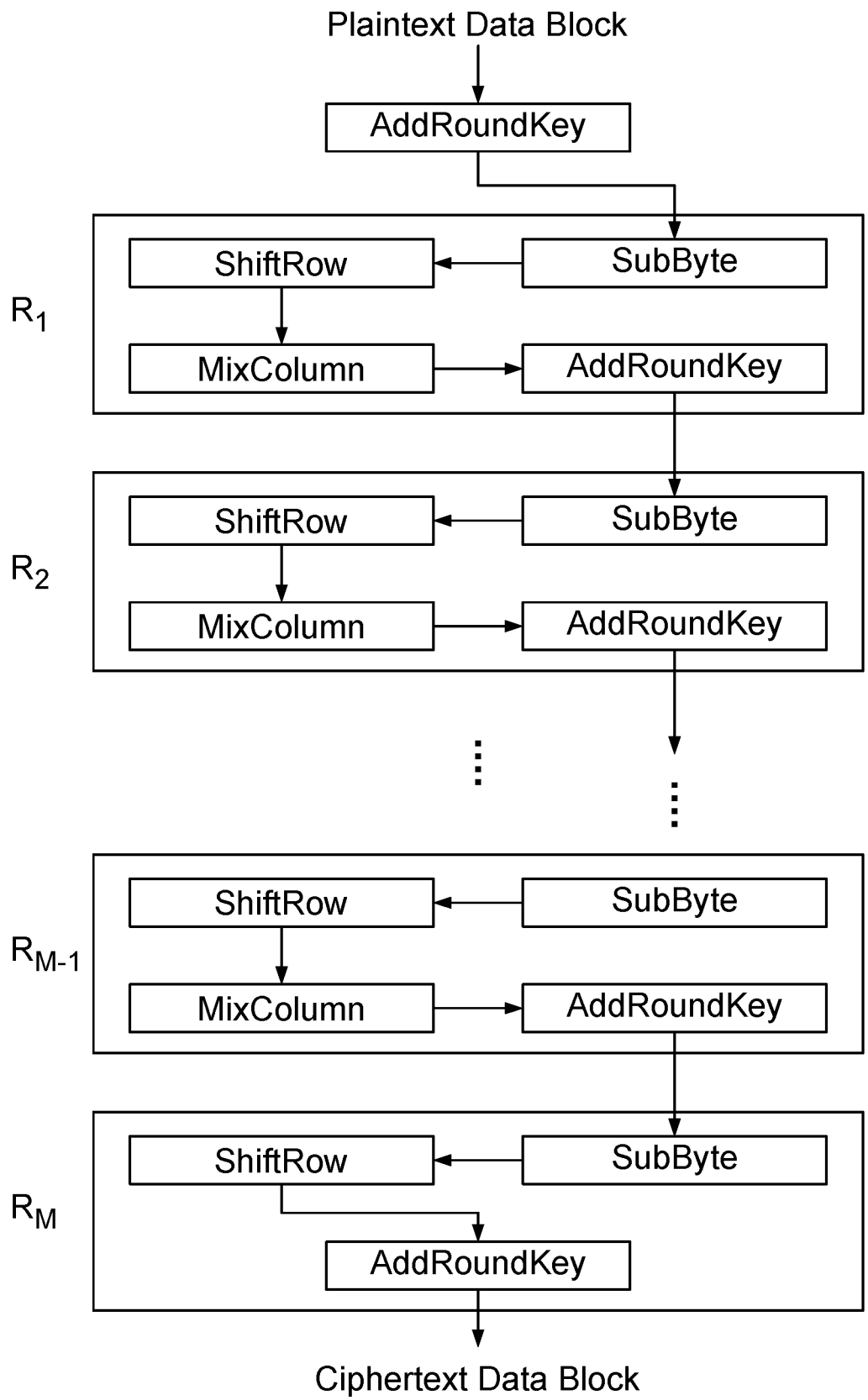
FIG. 1 illustrates a schematic diagram of an encryption process of the AES technique.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Considering the need for improvements to the prior art, embodiments of the present disclosure provide a device and method for data processing.

In some embodiments, a device for data processing is provided, including: a scheduler; and N data processing units coupled to the scheduler, where each of the N data processing units can independently complete an AES encryption operation for a data block, N being a positive integer (i.e., there is a plurality of data processing units). The scheduler is configured to control a target data processing unit among the N data processing units to receive a target data block that is to be encrypted. The target data processing unit is configured to generate a ciphertext data block corresponding to the target data block by performing the AES encryption operation on the target data block.

In some embodiments, a method for data processing is provided, including: controlling, using a scheduler, a target data processing unit among N data processing units to receive a target data block that is to be encrypted, where each of the N data processing units can independently complete an AES encryption operation for a data block, N being a positive integer; and generating a ciphertext data block corresponding to the target data block by performing the AES encryption operation on the target data block using the target data processing unit.

AES is a group-based encryption and decryption technique, i.e., each encryption or decryption is carried out based on a data block. For the AES technique, the length of the data block is usually 128 bits and the key length may be 128 bits, 192 bits or 256 bits. The AES technique is a key iterative grouping technique, in which the iterative action is performed using a Round function. The exact number of rounds acted upon may depend on the key length. For example, the number of rounds may be 10 when a key length is 128 bits. When the key length is 192 bits, the number of rounds may be 12. When the key length is 256 bits, the number of rounds may be 14. In this disclosure, M is used to denote the number of rounds. Therefore, depending on the key length, the AES technique may typically include AES-128, AES-192, and AES-256 types.

The Round function usually consists of four transformations: SubByte, ShiftRow, MixColumn, and AddRoundKey. For encryption or decryption operations, 10, 12 or 14 rounds of operations can be performed on plaintext data blocks starting from the initial AddRoundKey. The last round usually consists of three steps. FIG. 1 illustrates a schematic diagram of an encryption process of the AES technique. As shown in FIG. 1, after performing M rounds of operations on the plaintext data block, the corresponding ciphertext data block can be obtained.

Currently, fully parallel structures or semi-parallel structures are commonly used to implement the AES technique. In such an implementation, a set of hardware structures may include a plurality of computing units, and each computing unit may be responsible for one of the rounds of operations. The individual computing units form a pipeline architecture and work together to complete the encryption operations of a data block. However, this architecture can generally provide only the maximum throughput rate or half of the maximum throughput rate, which is difficult to adapt to various scenarios.

In view of above, the present disclosure provides a technical solution for data processing. The AES technique can be implemented at various throughput rates using the technical solution of embodiments of the present disclosure, thereby adapting to various application scenarios. It will be described below combined with specific embodiments.

Figure 2A:
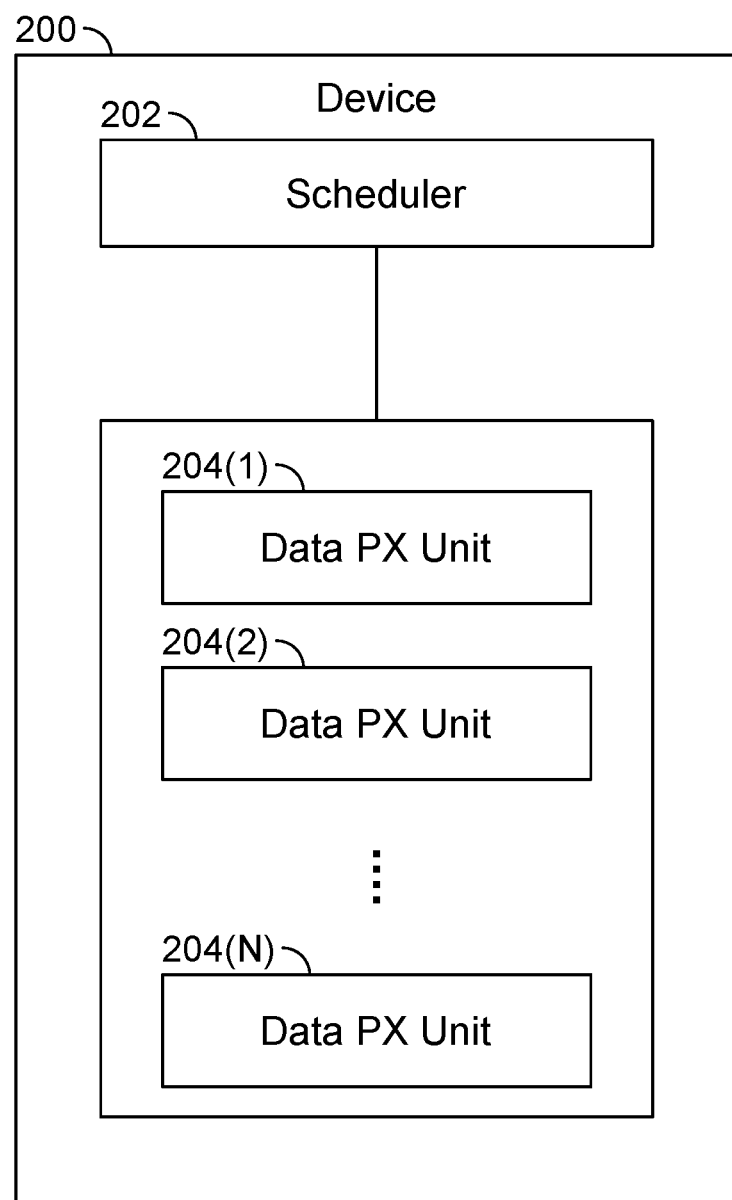
FIG. 2A illustrates a schematic block diagram of a device for data processing according to some embodiments.

FIG. 2A illustrates a schematic block diagram of a device for data processing according to some embodiments.

As shown in FIG. 2A, the device 200 may include a scheduler 202. In addition, the device 200 may include N data processing units 204(1), 204(2), . . . , 204(N). Here, N is a positive integer. Each data processing unit can independently complete the AES encryption processing for the data block. Specifically, each data processing unit can perform all M rounds of the AES encryption processing on the plaintext data block to generate the corresponding ciphertext data block.

Thus, the device 200 can implement AES encryption at different processing throughput rates by designing a specific value of N, e.g., any multiple of 1/10, 1/12 or 1/14 of the maximum throughput rate, which depends on the key length employed. In this way, the device 200 can be flexibly adapted to different application scenarios or requirements. For example, for scenarios that requires lower hardware costs but do not require high throughput rate, a smaller number of data processing units can be designed; while for scenarios requiring a higher throughput rate, a larger number of data processing units can be designed. This allows flexibility to meet user requirements.

In some embodiments, N may be predetermined based on a desired processing throughput rate. Of course, N can also be predetermined based on other factors, such as hardware overhead, power consumption, etc.

Specifically, the scheduler 202 may be coupled to N data processing units. It should be understood that the "be coupled to" mentioned herein may refer to the direct connection of two devices, or may refer to the indirect connection of two devices (e.g., other devices may exist between them), which is not limited herein.

The scheduler 202 may control a target data processing unit among the N data processing units 204(1), 204(2), . . . , 204(N) to receive a target data block that is to be encrypted. The target data block may be a plaintext data block. Specifically, when there is a target data block to be encrypted, the scheduler 202 may control one of the N data processing units 204(1), 204(2), . . . , 204(N) to receive the target data block. Here, the data processing unit that receives the target data block is referred to as the target data processing unit for ease of description.

In addition, as mentioned above, the AES technique can be performed in units of data blocks. Therefore, the data to be encrypted can be divided into one or more data blocks according to the data block length requirements of the AES technique. The target data block herein may be one of these one or more data blocks.

The target data processing unit can perform AES encryption operations on the target data block to generate a ciphertext data block corresponding to the target data block. For example, in the case where the AES technique is of type AES-128, the target data processing unit can perform 10 rounds of operations on the target data block to generate the corresponding ciphertext data block.

As can be seen, in the embodiments of the present disclosure, the AES encryptions of the data blocks can be efficiently achieved by scheduling data processing unit that can independently perform the AES encryption operation of the data block, and it can be adapted to various application scenarios.

In the embodiments herein, each data processing unit can independently complete the AES encryption operation for the data block. For example, in the case where the AES technique is of type AES-256, 14 rounds of operations are required for the encryption of each data block. Typically, a data processing unit can perform one round of operations in one clock cycle. Therefore, one data processing unit can independently perform the encryption operation for one data block in 14 clock cycles, which means that one data processing unit can encrypt one data block in 14 clock cycles. In this way, the exact value of N can be determined based on the actual demand, desired processing throughput rate, hardware overhead, power consumption, etc. For example, 3 data processing units can encrypt 3 data block in 14 clock cycles. 14 data processing units can encrypt 14 blocks in 14 clock cycles. As can be seen, different flexibility can be achieved for different needs in this way. Usually, the data processing unit can receive the data block to be encrypted in the earliest first clock cycle.

In some embodiments, the individual data processing units may include various hardware structures for performing AES operations such as SubByte, ShiftRow, MixColumn, and AddRoundKey. For example, the data processing unit can include a variety of appropriate combinatory logic, counters, and other structures.

In some embodiments, the scheduler 202 may determine the data processing unit that is idle among the N data processing units 204(1), 204(2), . . . , 204(N), as the target data processing unit described above.

For example, upon determining the presence of the target data block to be encrypted, the scheduler 202 may determine the idle states of the N data processing units 204(1), 204(2), . . . , 204(N). For example, the scheduler 202 may obtain idle state indications of the N data processing units 204(1), 204(2), . . . , 204(N), and determine the data processing units in the idle state based on the idle state indications. If a plurality of data processing units are in the idle state, the scheduler 202 may select one of the plurality of data processing units as the above-mentioned target data processing unit randomly or according to some preset rule.

For example, the scheduler 202 may use a round-robin mechanism to communicate with N data processing units 204(1), 204(2), . . . , 204(N). The scheduler 202 may sequentially inquire each data processing unit in a certain order whether it is idle, and then the first data processing unit that is idle in this order may be the target data processing unit as described above. Of course, other implementations can be used to determine the idle states of the N data processing units 204(1), 204(2), . . . , 204(N), which are not limited herein.

Figure 2B:
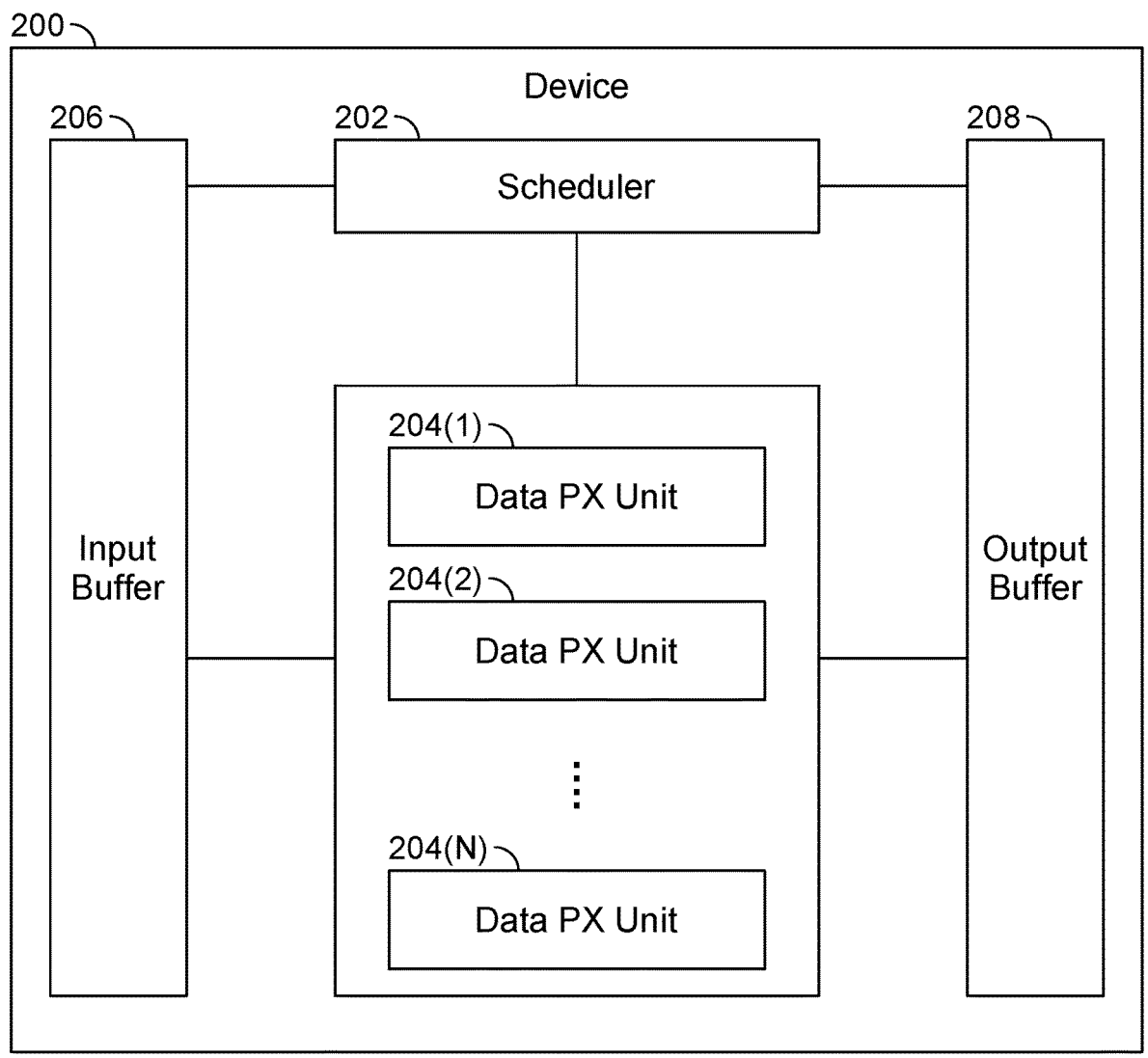
FIG. 2B illustrates another schematic block diagram of a device for data processing according to some embodiments.

In some embodiments, the device 200 may further include an input buffer. Besides, in some embodiments, the device 200 may further include an output buffer. For purposes of description, FIG. 2B illustrates another schematic block diagram of a device for data processing according to some embodiments. As shown in FIG. 2B, the device 200 may include an input buffer 206. In addition, the device 200 may include an output buffer 208.

The input buffer 206 may store data blocks to be encrypted, such as the target data block described above. Accordingly, the scheduler 202 may control the target data processing unit to receive the target data block from the input buffer 206. In some embodiments, the scheduler 202 and the input buffer 206 may support a handshake protocol. For example, the scheduler 202 and the input buffer 206 may communicate via a handshaking mechanism such that the scheduler 202 may determine whether the input buffer 206 has a target data block to be encrypted. If the scheduler 202 determines that the input buffer 206 has a target data block to be encrypted, it may control the target data processing unit to receive that target data block from the input buffer 206.

The output buffer 208 may store ciphertext data blocks, i.e., storing the result of the AES encryption operations performed by the data processing units.

In some embodiments, the scheduler 202 may control the target data processing unit to output the ciphertext data block to the output buffer 208 when it determines that the output buffer 208 has available storage space. If the scheduler 202 determines that the output buffer 208 has no available storage space, the scheduler 202 may control the target data processing unit to retain the ciphertext data block until the output buffer 208 has available storage space for receiving the ciphertext data block. For example, if the output buffer 208 does not have available storage space, then the target data processing unit may not output the ciphertext data block, but keep it inside. At this point, the target data processing unit also does not receive new data blocks to be encrypted. Once the output buffer 208 has available storage space, the scheduler 202 can control the target data processing unit to output the ciphertext data block to the output buffer 208. In this way, data loss can be effectively prevented, and thus the reliability of AES encryption can be improved.

Similarly, in some embodiments, the scheduler 202 and the output buffer 208 may support a handshaking protocol. For example, the scheduler 202 and the output buffer 208 may communicate via a handshaking mechanism that allows scheduler 202 to determine whether the output buffer 208 has available storage.

In some embodiments, both the input buffer 202 and the output buffer 208 may be First-In First-Out (FIFO) buffers.

In some embodiments, the scheduler 202 may control the order in which the target data processing unit outputs the target data block such that the output order of the ciphertext data block is the same as the input order of the target data block. That is, the scheduler 202 may control the target data processing unit to output the ciphertext data block in the order of the input of the target data block. For example, in the case where the data to be encrypted is divided into 10 data blocks, assuming that the target data block is the 5th data block of the input, then the ciphertext data block will be the 5th data block of the output. This ensures the correctness of the final ciphertext obtained.

For example, when the target data block is input to the target data processing unit, the order information for indicating the input order may be included in the target data block, then the ciphertext data block generated by the target data processing unit will also contain that order information, and based on that order information, the scheduler 202 may determine the output order of the ciphertext data block. In this way, the scheduler 202 can control to make the ciphertext data block output in that order. For example, in some cases, a plurality of data processing units may all generate corresponding ciphertext data blocks to be output, and the scheduler 202 may, in this manner described above, make the plurality of ciphertext data blocks to be output in the order of their corresponding plaintext data blocks, thereby ensuring the correctness of the ciphertext obtained.

Figure 2C:
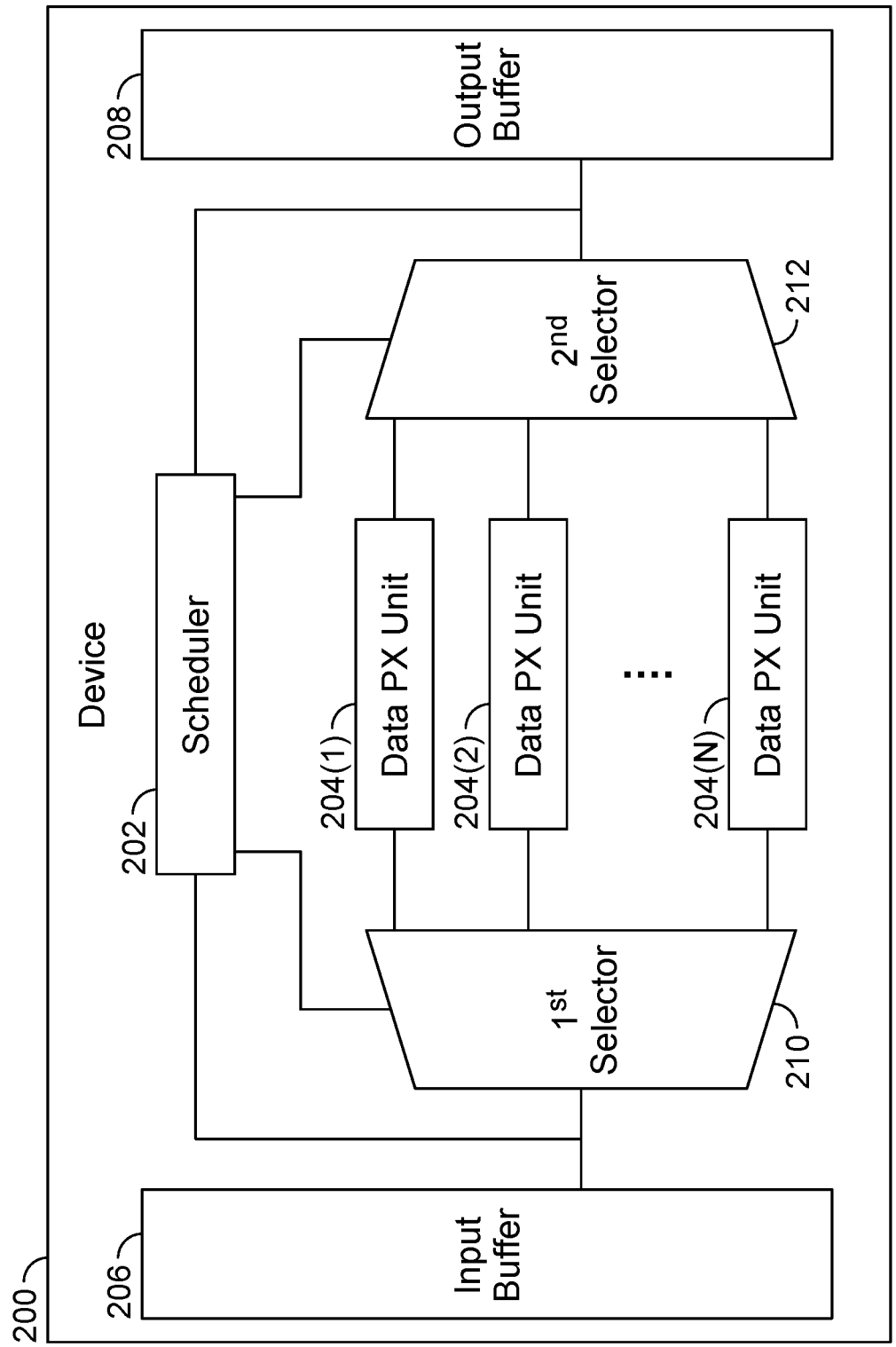
FIG. 2C illustrates another schematic block diagram of a device for data processing according to some embodiments.

In some embodiments, the device 200 may also include a first selector and a second selector. FIG. 2C illustrates another schematic block diagram of a device for data processing according to some embodiments. As shown in FIG. 2C, the device 200 may include a first selector 210 and a second selector 212.

The first selector 210 may be connected between the input buffer 206 and the N data processing units 204(1), 204(2), . . . , 204(N). Besides, the first selector 210 may be connected to the scheduler 202. The scheduler 202 may, by controlling the first selector 210, make the target data processing unit to receive the target data blocks from the input buffer 206.

The second selector 212 may be connected between the N data processing units 204(1), 204(2), . . . , 204(N) and the output buffer 208. Besides, the second selector 212 may be connected to the scheduler 202. The scheduler 202 may, by controlling the second selector 212, make the target data processing unit to output the ciphertext data blocks to the output buffer 208.

In some embodiments, both the first selector 210 and the second selector 212 can be implemented with an N-way selector.

Figure 3:
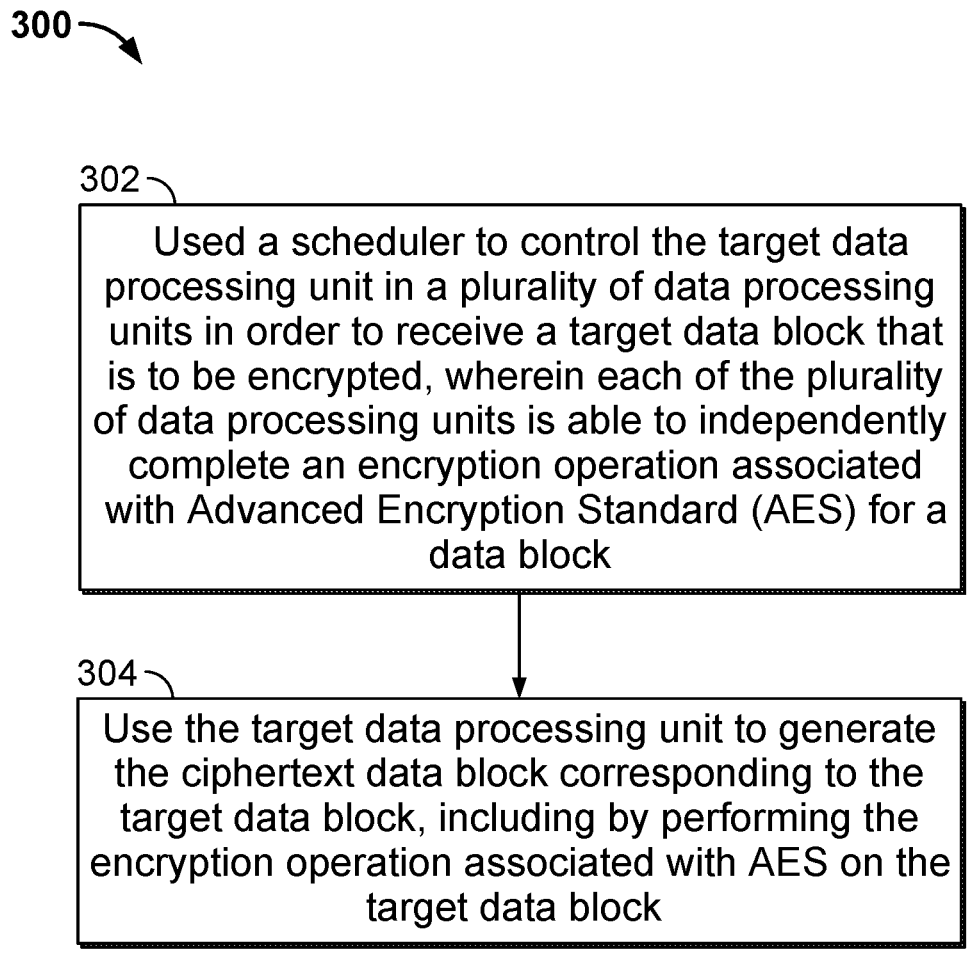
FIG. 3 illustrates a schematic flowchart of a method for data processing according to some embodiments.

FIG. 3 is a schematic flowchart of a method for data processing according to some embodiments. In one example, the process of the method 300 of FIG. 3 is performed by the aforementioned device 200.

In step 302, a scheduler is used to control the target data processing unit in a plurality of data processing units in order to receive a target data block that is to be encrypted, wherein each of the N data processing units (i.e., a plurality of data processing units) is able to independently complete an AES encryption operation (i.e., an encryption operation associated with AES) for the data block, where N is a positive integer.

In step 304, the ciphertext data block corresponding to the target data block is generated, including by performing the encryption operation associated with AES on the target data block using the target data processing unit.

In some embodiments, N (i.e., the number of data processing units) may be predetermined based on the desired processing throughput rate. Of course, N can also be set based on other factors or a combination of other factors, such as hardware overhead, power consumption, etc.

In some embodiments, a data processing unit that is idle among the N data processing units can be determined as the target data processing unit using the scheduler.

In some embodiments, the target data processing unit can be controlled to output the ciphertext data block to the output buffer using the scheduler, when the scheduler determines that the output buffer has available storage space.

In some embodiments, the data processing unit can be controlled to retain the ciphertext data block until the output buffer has available storage space for receiving the ciphertext data block, when the scheduler determines that the output buffer has no available storage space.

The specific process of the method 300 can be described with reference to the operations described above with respect to the device 200. Therefore, for the sake of brevity of description, the specific process of method 300 will not be repeated here.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller system, comprising:
a memory;
a processor coupled to the memory;
a plurality of data processing units; and
the processor communicates with the plurality of data processing units to cause each of the plurality of data processing units to independently perform an end-to-end encryption operation associated with Advanced Encryption Standard (AES) on a data block;
there is a selected key length, from a plurality of supported key lengths associated with the AES;
the number of data processing units in the plurality of data processing units is selected based at least in part on a desired processing throughput rate and power consumption, wherein the number of data processing units in the plurality of data processing units and the selected key length produce a total processing throughput rate, collectively for the plurality of data processing units, that is a multiple of one or more of the following: 1/10, 1/12 or 1/14 of a maximum throughput rate;
the processor communicates with a scheduler to cause the scheduler to select a target data processing unit, from the plurality of data processing units, including by:
sequentially communicating with the plurality of data processing units in a round-robin order to obtain an idle state information until an idle data processing unit in the plurality of data processing units is encountered; and
selecting the idle data processing unit to be the target data processing unit; and
the processor communicates with the target data processing unit to cause the target data processing unit to:
receive a target data block that is to be encrypted; and
generate a ciphertext data block corresponding to the target data block, including by performing the end-to-end encryption operation associated with AES, including all SubByte transformations, all ShiftRow transformations, all MixColumn transformations, and all AddRoundKey transformations on the target data block.

2. The storage controller system recited in claim 1, wherein:
the memory is configured to store the target data block; and
the target data processing unit receives the target data block from the input buffer.

3. The storage controller system recited in claim 1, wherein:
the storage controller system further includes an output buffer; and
the target data processing unit further:
determines whether the output buffer has sufficient storage space for the ciphertext data block; and
in the event it is determined that the output buffer has sufficient storage space for the ciphertext data block, outputs the ciphertext data block to the output buffer.

4. The storage controller system recited in claim 3, wherein the target data processing unit further: in the event it is determined that the output buffer has insufficient storage space for the ciphertext data block, retains the ciphertext data block until the output buffer has sufficient storage space for the ciphertext data block.

5. The storage controller system recited in claim 1, wherein the target data processing unit further: outputs the ciphertext data block in an output order that matches an input order of the target data block.

6. A method, comprising:
using each of a plurality of data processing units, in a storage controller system, to independently perform an end-to-end encryption operation associated with Advanced Encryption Standard (AES) on a data block, wherein:
the plurality of data processing units has a number of data processing units;
there is a selected key length, from a plurality of supported key lengths associated with the AES; and
the number of data processing units is selected based at least in part on a desired processing throughput rate and power consumption, wherein the number of data processing units and the selected key length produce a total processing throughput rate, collectively for the plurality of data processing units, that is a multiple of one or more of the following: 1/10, 1/12 or 1/14 of a maximum throughput rate;
using a scheduler, in the storage controller system, to select a target data processing unit, from the plurality of data processing units, including by:
sequentially communicating with the plurality of data processing units in a round-robin order to obtain an idle state information until an idle data processing unit in the plurality of data processing units is encountered; and
selecting the idle data processing unit to be the target data processing unit; and
using the target data processing unit, in the storage controller system, to:
receive a target data block that is to be encrypted; and
generate a ciphertext data block corresponding to the target data block, including by performing the end-to-end encryption operation associated with AES, including all SubByte transformations, all ShiftRow transformations, all MixColumn transformations, and all AddRoundKey transformations on the target data block.

7. The method recited in claim 6, further including:
the storage controller system further includes an input buffer that stores the target data block; and
the method further includes using the target data processing unit to receive the target data block from the input buffer.

8. The method recited in claim 6, wherein:
the storage controller system further includes an output buffer; and
the method further includes using the target data processing unit to:
determine whether the output buffer has sufficient storage space for the ciphertext data block; and
in the event it is determined that the output buffer has sufficient storage space for the ciphertext data block, output the ciphertext data block to the output buffer.

9. The method recited in claim 8, further including: using the target data processing unit to in the event it is determined that the output buffer has insufficient storage space for the ciphertext data block, retain the ciphertext data block until the output buffer has sufficient storage space for the ciphertext data block.

10. The method recited in claim 6, further including: using the target data processing unit to output the ciphertext data block in an output order that matches an input order of the target data block.

* * * * *